United States Patent
Greenberger et al.

(10) Patent No.: US 10,169,003 B2
(45) Date of Patent: Jan. 1, 2019

(54) COGNITIVE SCOPE ANALYZER

(71) Applicant: INTERNATIONAL BUSINESS MACHINES CORPORATION, Armonk, NY (US)

(72) Inventors: Jeremy A. Greenberger, Raleigh, NC (US); James R. Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/479,637

(22) Filed: Apr. 5, 2017

(65) Prior Publication Data
US 2018/0293056 A1    Oct. 11, 2018

(51) Int. Cl.
*G06F 9/44*   (2018.01)
*G06F 8/34*   (2018.01)
*G06F 3/0481* (2013.01)

(52) U.S. Cl.
CPC ............ *G06F 8/34* (2013.01); *G06F 3/04815* (2013.01); *G06F 3/04817* (2013.01)

(58) Field of Classification Search
CPC ....... G06F 11/3688; G06F 11/30; G06F 11/34
USPC ........................................ 717/106, 109, 124
See application file for complete search history.

(56) References Cited

U.S. PATENT DOCUMENTS

| | | | |
|---|---|---|---|
| 7,096,456 B2 | 8/2006 | Hanson et al. | |
| 7,584,452 B1 | 9/2009 | Johnson | |
| 7,797,294 B2* | 9/2010 | Gartner | G06F 9/451 707/705 |
| 8,589,872 B2 | 11/2013 | Cowtan | |
| 8,595,685 B2 | 11/2013 | Sharma et al. | |
| 8,631,323 B1* | 1/2014 | Gray | G06F 8/33 715/255 |
| 8,869,052 B2* | 10/2014 | Dattke | G06F 8/38 715/762 |
| 8,966,441 B2* | 2/2015 | Cohanoff | G06F 8/30 717/115 |
| 8,990,764 B2* | 3/2015 | Armstrong | G06F 8/30 717/100 |

(Continued)

OTHER PUBLICATIONS

Konat et al., "Language-Parametric Name Resolution Based on Declarative Name Binding and Scope Rules", 2015.*

(Continued)

*Primary Examiner* — Phillip H Nguyen
(74) *Attorney, Agent, or Firm* — Cantor Colburn LLP; Rahan Uddin

(57) ABSTRACT

Technical solutions are described for augmenting cognitive scope of a programming object in a programming development system. For example, a computer-implemented method includes determining, by a processor, a scope of a programming object in a computer program. The method further includes generating, by the processor, a cognitive programming user-interface mask corresponding to a programmer profile. The method further includes applying, by the processor, the cognitive programming user-interface mask to a user-interface of the programming development system, the user-interface displaying an indication of the scope of the programming object.

19 Claims, 4 Drawing Sheets

(56) References Cited

U.S. PATENT DOCUMENTS

| | | | |
|---|---|---|---|
| 2009/0187833 A1* | 7/2009 | Cheng | G06Q 10/10 715/757 |
| 2010/0211638 A1* | 8/2010 | Rougier | G06F 8/30 709/205 |
| 2013/0340076 A1 | 12/2013 | Cecchetti et al. | |
| 2014/0109042 A1 | 4/2014 | Christensen | |

OTHER PUBLICATIONS

Bani-Salamed et al., "A Social Collaborative virtual environment for software development", 2010.*
Bani-Salameh et al., "Teaching and Learning in a Social Software Development Tool" (Year: 2011).*
Bani-Salamed et al., "SCI: Towards a Social Collaborative Integrated Development Environment" (Year: 2009).*
Thomas Ball, "The Concept of Dynamic Analysis", Bell Laboratories, Lucent Technologies, 1999, pp. 1-19.
Wikipedia, "Naming Convention", The Free Encyclopedia, Dec. 18, 2016, pp. 1-2.

* cited by examiner

COGNITIVE SCOPE ANALYZER

BACKGROUND

The present application relates in general to computer technology, and more specifically, to a system that can analyze computer program products, such as a code, to determine cognitive scope of programming objects and provide interface for a developer to interact with the programming objects according to the cognitive scope.

In typical integrated development environments (IDEs) used by a programmer to create/maintain computer program products that include code, portions of the code such as keywords, variables, functions and numbers can be displayed to the programmer and distinguished from the main body of the code by different coloring schemes. For example, one color can be used to identify all variables, and another color can be used to identify keywords. However, even with such coloring schemes to identify variables, the type or scope of each variable cannot be readily determined and this type of coloring scheme can be of limited use to the programmer.

SUMMARY

According to one or more embodiments of the invention, a computer implemented method for augmenting cognitive scope in a programming development system includes determining, by a processor, a scope of a programming object in a computer program. The method further includes generating, by the processor, a cognitive programming user-interface mask corresponding to a programmer profile. The method further includes applying, by the processor, the cognitive programming user-interface mask to a user-interface of the programming development system, the user-interface displaying an indication of the scope of the programming object.

According to one or more embodiments, a programming development system includes a memory, and a virtual reality device that displays a user-interface including a virtual world representation of a computer program. The system further includes a processor coupled with the memory and the virtual reality device. The processor determines a scope of a programming object in the computer program. The processor generates a cognitive programming user-interface mask corresponding to a programmer profile. The processor applies the cognitive programming user-interface mask to the virtual world displayed by the virtual reality device, the user-interface displaying an indication of the scope of the programming object.

According to one or more embodiments, a computer program product for a programming development system includes a computer readable storage medium having program instructions embodied therewith. The program instructions are executable by a processing circuit to cause the processing circuit to display a user-interface including a virtual world representation of a computer program. The program instructions also cause the processing circuit to includes determine a scope of a programming object in the computer program. The program instructions also cause the processing circuit to generate a cognitive programming user-interface mask corresponding to a programmer profile. The program instructions also cause the processing circuit to apply the cognitive programming user-interface mask to the virtual world for displaying an indication of the scope of the programming object.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
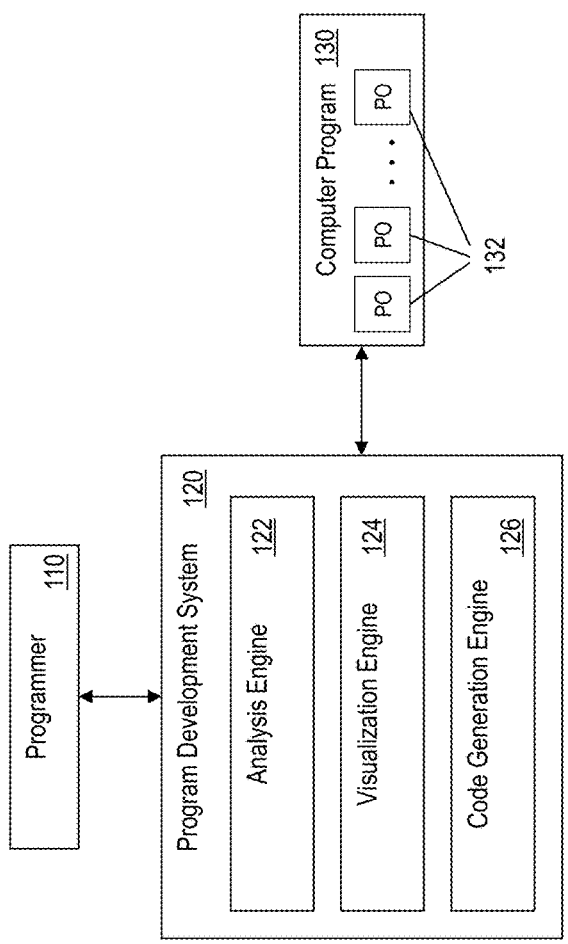
FIG. 1 illustrates a programming development system, according to one or more embodiments of the invention.

In programming, "scope" refers to visibility of a programming object used in the code. A programming object can be a variable, a function, a constant, an object as used in object-oriented programming language, or any other basic construct that is used in the programming language used to develop a computer program product. In other words, the "scope" indicates which parts of the program can see or use the programming object. For example, in a programming language a programming object can have a global scope. In other words, once defined, every part of the program can access the programming object. Typically, a programmer can limit a programming object's scope to a single function, or object. In other words, the programming object can have a limited scope. In object-oriented programming language, scope of the programming object is of critical importance, and is closely related to the notion of member access, wherein some members of an object are publicly exposed, while others are held private. In other words, scope describes a binding of a name to a programming object, such as variable, function, or other program entity. The name is applicable only in a specific region of the computer program where the binding is valid—the programming object's "scope." When a programmer misunderstands the scope of a name/entity binding, the programmer may use the variable name, thinking it refers to one entity, when in fact the name refers to another. This means that a programmer must at all times keep a cognitive representation of scope, so that bugs are not introduced.

It should be noted that programming is directed at such programming objects, and that the names of the programming objects are merely conventions for manipulating their data by means of the program. Accordingly, as used herein a "cognitive scope" is the name/binding a programmer associates with a programming object, as well as the predicates upon which this association is based. As used herein, cognitive scope represents parts of the program that the programmer is working with. In one or more examples, the cognitive scope of a programmer may be the same as the scope of a programming object. Alternatively, the cognitive scope may be larger than the scope of the programming object. Alternatively yet, the cognitive scope may be smaller than the scope of the programming object.

At root of the cognitive scope, the key predicate is the programming object itself, in memory, which the programmer aims to manipulate. As facilitated by the technical features herein, representing such a programming object visually, such as by a visual rendering of an object in a virtual space allows to show how the object may be named differently in different scopes.

This then allows the programmer to create a better cognitive scope for the programming object by "seeing" that name bindings may switch, but the underlying data entity persists and is the same. Similarly, these predicates may include a representation of how the programming object came into existence in the program, and therefore cognitive scope may include traces of the object in the rendered space. This is particularly important as the entity may need to be managed in memory (e.g., deleted) to avoid memory leaks, before it goes out of scope. The technical solutions described herein can represent these conditions readily and intuitively to augment cognitive scope of the programmer.

Described here are technical solutions for determining the scope of the programming object, and generating one or more cognitive analogies corresponding to the scope and accessibility, and further for augmenting the scope and accessibility of the programming object in a virtual world based programming user interface. As such the technical solutions are rooted in and/or tied to computer technology in order to overcome a problem specifically arising in the realm of computers, specifically integrated development environment (IDE) systems used for developing computer program products, and particularly virtual world IDE.

FIG. 1 illustrates a programming development system 120, according to one or more embodiments. The programming development system 120 includes, among other components, an analysis engine 122, a visualization engine 124, and a code generation engine 126. A programmer 110 develops and/or maintains code associated with a computer program 130 using the programming development system 120.

The computer program 130 includes one or more computer executable instructions. In one or more examples, the computer program 130 is stored on a computer readable memory storage included in the programming development system 120. Alternatively, or in addition, the computer program 130 is stored on a device such as a server computer or the like, separate from the programming development system 120.

The programmer 110 can be a programming client device, such as a laptop computer, a desktop computer, a tablet computer, or any other such communication device used to access the programming development system 120. In one or more examples, a user, such as a software developer, or a computer programmer uses the programmer 110 to access the programming development system 120.

Figure 2:
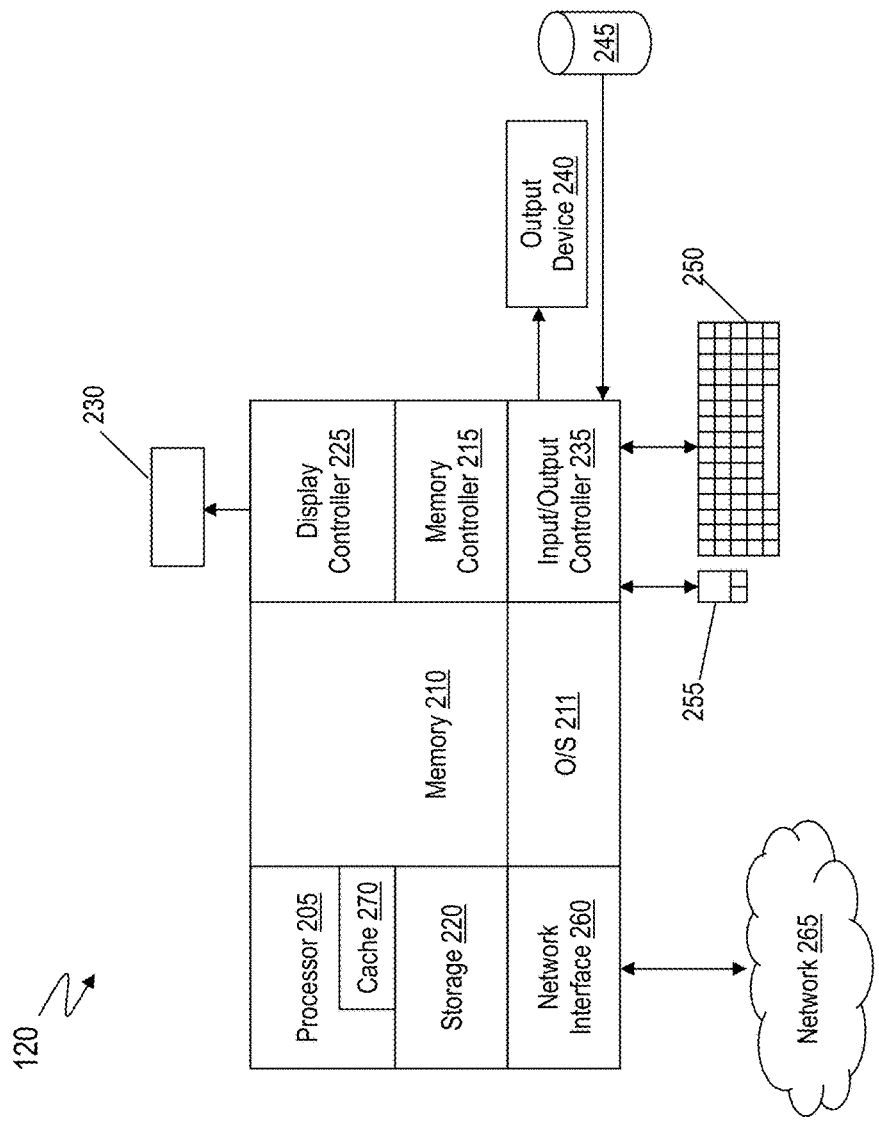
FIG. 2 illustrates an example programming development system, according to one or more embodiments of the invention.

FIG. 2 illustrates an example programming development system 120, according to one or more embodiments. The programming development system 120 may be a communication apparatus, such as a computer. For example, the programming development system 120 may be a desktop computer, a tablet computer, a laptop computer, a phone, such as a smartphone, a server computer, or any other device that communicates via a network 265. The programming development system 120 includes hardware, such as electronic circuitry. In one or more examples, the programming development system 120 facilitates providing the programmer 110 a virtual reality representation of the computer program 130.

The programming development system 120 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the programming development system 120, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The programming development system 120 may further include a display controller 225 coupled to a user interface or display 230. In some embodiments, the display 230 may be an LCD screen. In other embodiments, the display 230 may include a plurality of LED status lights. The display 230 may include a virtual reality device. In some embodiments, the programming development system 120 may further include a network interface 260 for coupling to a network 265. The network 265 may be an IP-based network for communication between the programming development system 120 and an external server (such as the computer program 130), client (such as the programmer 110) and the like via a broadband connection. In an embodiment, the network 265 may be a satellite network. The network 265 transmits and receives data between the system 100 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

The components of the programming development system 120, such as the analysis engine 122, the visualization engine 124, and the code generation engine 126 include computer executable instructions. In one or more examples, the components include electronic circuits, such as application specific integrated circuits (ASIC), field programmable gate arrays (FPGA), and/or other such hardware.

The analysis engine 122 facilitates accessing and parsing the computer program 130. The analysis engine 122 performs syntactic and/or semantic analysis of the one or more instructions of the computer program 130. The analysis engine 122 determines a scope of a programming object 132 based on the syntactic and semantic analysis. The programming object 132 may include a variable, an object (such as a class), a function, a constant, or any other programming construct supported by the programming language used for the computer program 130. The computer program 130 includes one or more programming objects 132.

In one or more examples, the analysis engine 122 operates for a specific programming language, and the programming development system 120 includes multiple analysis engines for separate programming languages respectively. Alternatively, or in addition, the analysis engine 122 operates for multiple programming languages.

The analysis engine 122 further parses the programming object 132 to determine one or more members of the programming object 132. For example, the programming object 132 may be a function, or a class, or other such programming construct that includes member variables, member functions, and the like. Each member of the programming object 132 has a scope, such as private, and/or public. The analysis engine 122 determines the scope for each of the members of the programming object 132. Accordingly, the analysis engine 122 analyzes the dependencies between one or more data items and functions in the computer program 130, at least with regard to scope, private public membership conventions, and architectural inheritance.

The analysis engine 122 further generates a programmer profile corresponding to the programmer 110. In one or more examples, the analysis engine 122 generates different profiles for different programmers respectively. The programmer profile for the programmer 110 includes a current UI state, a history of accessing various programming objects and/or lines of code from the computer program 130, authorship status of the lines of code from the computer program 130, expertise information and metrics, and a history programming errors, among other information. For example, the programmer profile may further include identification information for the programmer 110, such as name of a user, a unique-identifier (e.g.: alpha-numeric string), an IP address, and the like.

The visualization engine 124 provides a user-interface for the programmer 110 to interact with the computer program 130, such as the programming objects 132 from the computer program 130. In one or more examples, the visualization engine generates one or more screens for displaying via the display 230. In one or more examples, the visualization engine 124 displays the computer program 130 in the form of editable text that the programmer 110 can manipulate, such as select, change, add to, and the like.

In one or more examples, the visualization engine 124 provides a virtual world representation of the computer program 130 and the programming objects 132. For example, a virtual world, or universe is a computer-based simulated environment intended for its residents to traverse, inhabit, and interact through the use of avatars. An example virtual world is IBM™ SECOND LIFE™. The virtual world can be represented using 3-D graphics and landscapes, and can be populated by many thousands of users, known as "residents." Other terms for virtual worlds include metaverses and "3D Internet." The virtual world can be traversed by such methods as walking, flying, and teleporting. A teleport provides a mechanism to travel rapidly from one location in the virtual world to another location, even if the locations are 'geographically' far apart in the virtual world.

Figure 3:
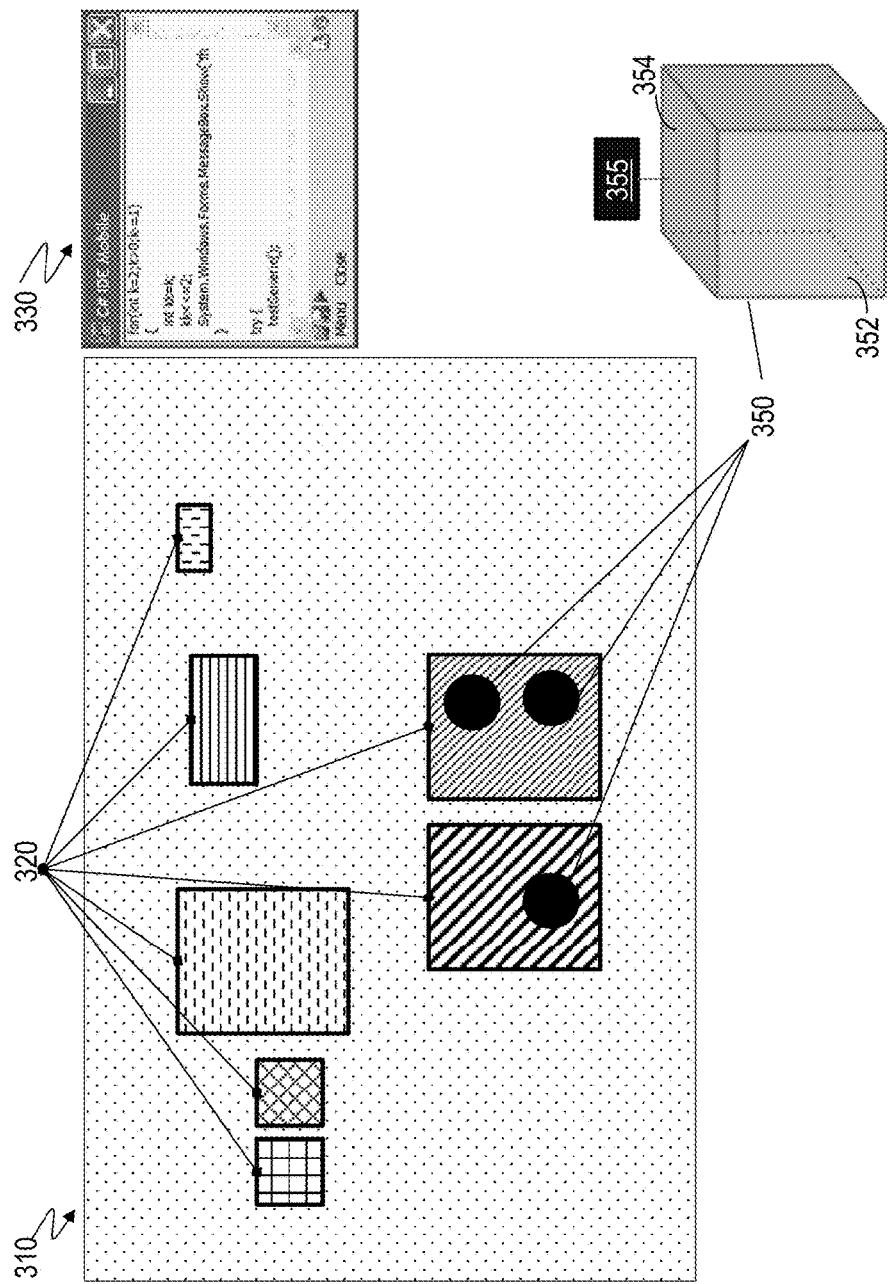
FIG. 3 illustrates an example virtual world, according to one or more embodiments of the invention.

FIG. 3 illustrates an example virtual world 310, according to one or more embodiments. It should be noted that the programming development system 120 renders the computer program 130 using the virtual world 310 in addition to an editor view, where the computer executable instructions are displayed in text form. The programmer 110 can switch between the virtual world 310 and the text-editor rendering of the computer program 130.

In the illustration, the virtual world 310 is divided into multiple regions 320. In one or more examples, each region 320 represents a part of the computer program 130, for example, a file, a class, a function, and the like. In one or more examples, each region 320 may represent a scope from the computer program 130. It should be understood that the illustrated virtual world is just an example, and that in other examples, the computer program 130 can be represented in different manner. For example, the computer program 130 may be represented as a building, a park, an island, or any other visual representation, with each programming object 132 being a part of the visual representation. For example, in case the computer program 130 is represented by a virtual world 310 of a building, a region 320 representing a corresponding scope in the computer program 130 can be a virtual room, with programming objects 132 accessible in that scope (virtual room) visibly displayed in the virtual room. In other examples, the regions 320 are represented by other visual artifacts that depict boundaries of the corresponding scopes. In one or more examples, the programming objects 132 are artifacts 350 in the virtual room, such as a model of a physical object, for example, a soldier, a plant, a mug, a pen, a painting, or any other object in the virtual room.

The artifacts 350 are virtual objects rendered in the virtual world 310. In one or more examples, the artifacts 350 are interactive. FIG. 3 illustrates an example artifact 350. It should be noted that while the illustration displays a 3D cube, in other examples, the artifact 350 may have any other shape, or dimensions. The artifact 350 may include multiple surfaces, of which a subset of surfaces, such as a surface 352 is visible from a viewpoint of the avatar of the user, and another subset of surfaces, such as a surface 354 is hidden from the viewpoint. In one or more examples, the artifact 350 may be associated with a banner 355, which facilitates annotating the artifact 350. For example, the banner 355 includes one or more textual, numeric, graphical, or any other type of information elements indicative of one or more attributes of the programming object 132 represented by the artifact 350. In one or more examples, one or more surfaces of the artifact 350 may be used as, and/or include, the banner 355.

In one or more examples, the visualization engine 124 facilitates generating and presenting the virtual world 310 as a massively multiplayer online world (MMOW). In one or more examples, the MMOW is a computer-based simulated environment populated by many programmers 110 who can create a personal avatar, and simultaneously and independently explore the virtual world, participate in its activities and communicate with others. The avatars can be textual, two or three-dimensional graphical representations, or live video avatars with auditory and touch sensations. In general, virtual worlds allow for multiple programmers 110. In one or more embodiments described herein, one avatar represents the programmer 110, and other avatars can be artificial intelligence (AI) agents or props, not guided by real people.

In one or more examples, the virtual world 310 is a busy place with multiple programmers 110 logged on at any moment. If a single programmer 110 is sent numerous teleport invitations, the programmer 110 may not want to interrupt their current activity or work in order to accept the invitations. Multiple teleport invitation popup windows can clutter the programmer's 110 screen distracting from the current activity. The programmer 110 may also wish to consider teleport invitations when a more appropriate time is available, giving the user the option to accept, reject, or save the invitation. Typically, once the programmer 110 has received multiple teleport invitations, the programmer 110 cannot prioritize or administer the invitations. Prioritization of teleport invitations can be important in areas related to business applications where teleport invitations represent system event notifications demanding immediate attention. In one or more examples, the visualization engine 124 addresses such technical limitations, by facilitating the teleport invitations to be selectable from a queue so the programmer 110 can accept the invitation, reject it, save it, or forward it to another programmer 110 or group. A programmer 110 can setup default priorities based on the invitation senders, and invitation type. In one or more examples, automatic rules and agents may reduce active steps the programmer 110 has to take to sets priorities.

For example, in the programming development system 120, the programmer 110 can be sent teleport invitations, by the programming development system 120 or by other programmers 110, to explore concepts of scope and related programming issues. Once the programmer 110 has received multiple teleport invitations, the programming development system 120 can provide a way to prioritize or administer the invitations, in part to control cognitive overload for the programmer 110.

For example, in the virtual world 310 generated by the visualization engine 124 of the programming development system 120, an invitation for teleporting represents an offer to transport the programmer 110 from the programmer's 110 current coding location to a second location. Such an invitation may be sent by the programming development system 120 or by another programmer. The programmer 110 may reject or accept the offer for teleporting. For example, if his or her cognitive load is currently too high, he/she may turn down the offer. If the programmer 110 accepts the offer, for example by selecting the invitation presented as words or any other graphical artifact on the user-interface, the programmer's avatar is then transported from the current location to the second location in the virtual world. In practical terms, teleportation refers to the "re-rendering" of an avatar in a different region 320 of the code, a different code environment, etc.

Avatars give a different, and an easier (cognitive) way of visualizing the computer program 130 for specific programmers 110, classes of programmers, companies, contractors, etc., and this may all be viewed by a third-party such a program manager person or even a funding agency who is overseeing the work. Further, the virtual world, which is a 3D world, facilitates explorations of a third dimension that is less readily understood with 2 dimensions. For example, the third dimension may indicate certain aspects of the code, certain regions of difficulty, certain regions of large amounts of code changes, sections of code used often or rarely, regions of code over which programmers may "fight," regions of the code prone to bugs, etc. The 3D virtual world 310 are generated and rendered to suit different programmer preferences.

The programming objects 130, such as variables and functions are represented by 3D items in the virtual world 310. The third dimension indicates characteristics of the programming objects 130, such as how often a variable is used or function is called, variable or functions code over which programmers may "fight," variables or functions prone to bugs or misunderstandings regarding scope, etc. Further yet, the virtual world 310 depicts considerations and visualizations related to refactoring, which is a software maintenance activity where source code is modified to improve readability or improve code-structure. For example, the virtual world 310 can show regions of code that may need refactoring to bring it into conformance with a team's stated coding standards after its initial release. Common refactoring activities are changing variable names and even breaking large methods (or functions) into smaller ones.

The programming development system 120 may further facilitate the programmer 110 to develop code in compliance with one or more coding standards, such as programming object names, scope and other standards for the computer program 130. For example, the programming development system 120 thus facilitates creating a uniform and valid naming convention and to ensure that the names of programming objects 130, such as functions are descriptive of what the programming object 130 actually does and of its scope. A naming convention is a set of rules for choosing the character sequence to be used as identifiers of the programming objects 130, which denote variables, types, functions, and other entities in source code and documentation. For example, companies and/or project teams establish a set of conventions to best meet their interests. Even with known and well-defined naming conventions in place, organizations may fail to consistently adhere to the standards, causing inconsistency and confusion about the code in the computer program 130. These technical challenges may be exacerbated if the naming convention rules are internally inconsistent, arbitrary, difficult to remember, or otherwise perceived as more burdensome than beneficial. Accordingly, the programming development system 120 facilitates maintaining the computer program 130 in compliance with a coding standard.

In one or more examples, the programming development system 120 suggests names for one or more of the programming objects 130 after an analysis of the computer program 130 and also as a function of one or more weighting factors. For example, following formula generates a suggested name for a programming object 130.

$f$(name)=$w1$*(need to reduce the effort to read and understand source code)

+$w2$*(enable code reviews to focus on important issues rather than arguing over syntax and naming standards)

+$w3$*(enable code quality review tools to focus reporting on significant issues other than syntax and style preferences)

+$w4$*(enhance source code appearance, e.g., by disallowing overlong names or unclear abbreviations)

+$w5$*(need to properly suggest "scope").

In the above, w1, w2, w3, w4, and w5, are weighting factors that are predetermined according to the coding standard, or configured by the programmer 110. The code generation engine 126 of the programming development system 120 generates the suggested name according to the predetermined weighting factors.

Additionally, in one or more examples, the programming development system 120 suggests the names after an analysis of the computer program 130 and as a function of the following function.

$f$(name)=$w1$*(name length:shorter identifiers may be expedient, because they are easier to type)

+$w2$*(short limit: extremely short identifiers (such as 'i' or 'j') are very difficult to uniquely distinguish using automated search and replace tools)

+$w3$(longer identifiers may be preferred because short identifiers cannot encode enough information or are too cryptic)

+$w4$*(long limit: longer identifiers may be discouraged because of visual/cognitive clutter).

In one or more examples, the weighting factors are configurable. For example, the weighting factors can be controlled by a user, team, or company, and/or they may be chosen automatically as a result of learning based on team feedback, customer feedback, QoS feedback, manager feedback, etc. in one or more examples, various programmer cohorts may be considered as well. For example, the cognitive aspect suggested by "w1" may vary from team to team based on company, programmer team experience, country, culture, task, a record of errors/problems for a team/company, etc. Useful parameter sets may be exchanged or sold between different programming development systems 120.

Accordingly, the programming development system 120 can aid in addressing readability of the computer program 130. For example, a computer executable instruction b=c*d is syntactically correct, however its purpose is not evident, nor is the scope. Contrast this with weekly_points_earned=hours_worked*point_pay_rate, which indicates the intent and meaning of the source code clearly. Note that a single word may not be as meaningful, or specific, as multiple words. Consequently, when cognitively appropriate, the programming development system 120 specifies rules for the treatment of "compound" identifiers containing more than one word. Thus, the programming development system 120 facilitates generating and maintaining a large code-base because a large amount of the lifetime cost of a piece of software involves code maintenance, and very rarely is a software maintained over its entire lifecycle by one author or team, or the original author or team.

In some cases, a graphic or icon helps the programmer 110 when coding, so as to take into account the above functions. Certain icons may quickly suggest a large scope or restricted scope (e.g. an icon of a wheat field vs a jail cell). Accordingly, as the programmer 110 is writing code, the programming development system 120 generates and renders one or more graphic or icon that indicates one or more attributes of the programming object that the programmer 110 is using/developing code for.

Figure 4:
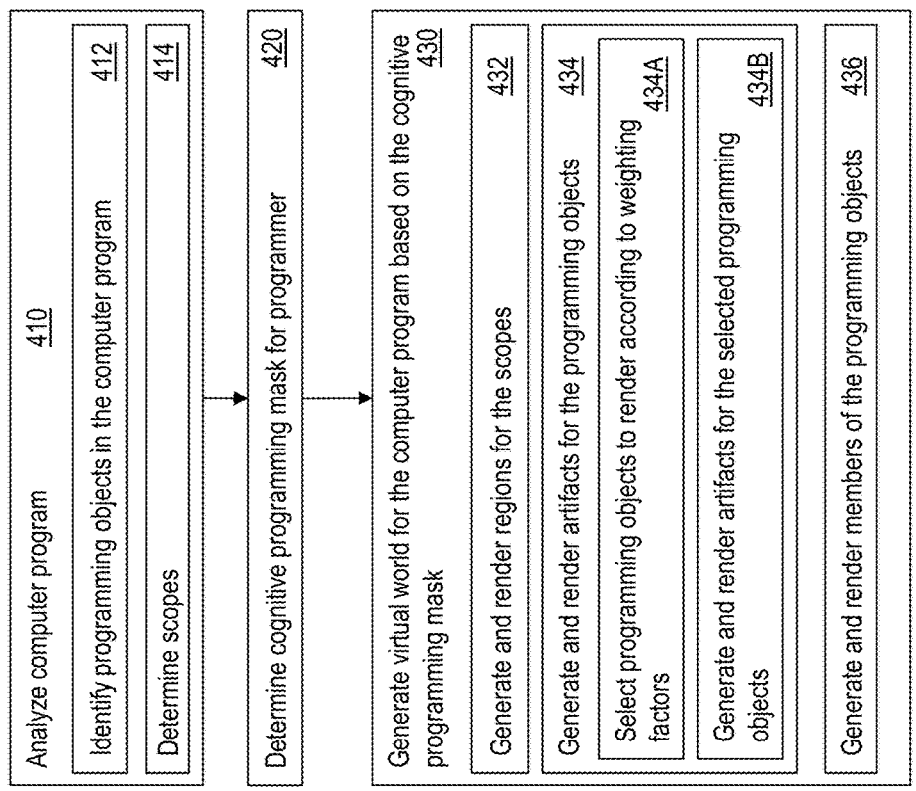
FIG. 4 illustrates a flow chart of an example method for augmenting cognitive scope in a programming development system, according to one or more embodiments of the invention.

FIG. 4 illustrates a flow chart of an example method for augmenting cognitive scope in a programming development system, according to one or more embodiments. The programming development system 120 analyzes the computer program 130, as shown at 410. For example, the analysis engine 122 parses and performs syntactic and sematic analysis of the computer program 130. The analysis engine 122 identifies the programming objects 132 in the computer program 130, as shown at 412. The analysis engine 122 further determines the scope of the one or more programming objects 132, as shown at 414.

The programming development system 120 further determines a cognitive programming mask for the programmer 110, as shown at 420. The programming development system 120 generates the cognitive programming mask based on the programmer profile, to improve effectiveness of the programmer 110 at minimizing errors and increasing programmer productivity. For example, the mask assigns a weighting factor to a scope relationship of the currently UI-accessible variables and methods, according to a programmer 110 specific configured weighting factors described herein. For example, the cognitive programming mask is based on the programmer profile, and is a set of configuration parameters for an augmented cognitive scope UI.

The programming development system 120 further generates the virtual world 310 for the computer program 130, as shown at 430. The visualization engine 124 generates the virtual world 310 based on the cognitive programming mask. For example, the visualization engine 124 augments the virtual world 310 with cognitive enhancers to allow a user to better grasp the scope and dependencies present in the portion of the computer program 130 being observed/worked on that is identified by the UI-state in the programmer profile.

For example, the visualization engine 124 generates and renders the regions 320 for the scopes, as shown at 432. Further, the visualization engine 124 generates and renders artifacts for the programming objects 132, as shown at 434. In one or more examples, the visualization engine 124 renders the artifacts within the corresponding scope of the programming object 132. In addition, in the textual rendering of the programming objects 132 (for example, code-view) in the programming development system 120, the visualization engine 124 adds graphical identification to depict a scope of the programming object 132. The visualization engine 124 further generates and renders members of the programming objects 132, as shown at 436.

In one or more examples, the programming development system 120 does not render all the programming objects 130 in scope in the virtual world 310. Instead, the visualization engine 124 selects one or more of the programming objects 130 according to a display-factor assigned to the programming objects 130 by the programmer profile, as shown at 434A. For example, the display-factor is a weighting factor that is indicative of a level of cognitive enhancement, determined specifically to the programmer's abilities and experience. For example, the programmer's profile indicates a number of times the programmer 110 has worked with the computer program 130, and/or a number of times the programmer 110 has worked on specific portion of the computer program 130 that is currently being displayed. Alternatively, or in addition, the display-factor takes into consideration a number of years of experience the programmer 110 has with the technology (such as programming language) being used for developing the computer program 130. The visualization engine 124 selects only the programming objects 130 that are within the scope being rendered and further only the programming objects that have the display-factor above a predetermined threshold.

The visualization engine 124 further generates and renders artifacts only for the selected programming objects 130 in this manner. Thus, only artifacts for the selected programming objects are displayed in the virtual world 310, based only on the programming objects 130 that have a display-factor above a predetermined threshold.

As described herein, the virtual world 310 rendering exists side by side with another user-interface that displays a text-editor display 330 of the computer program 130. In one or more examples, the programmer 110 can switch between the use of the augmented virtual reality interface 310 and the text-editor user-interface 330 of the programming development system 120 using a user-interaction, such as a key stroke, a gesture in the virtual world 310, an audio command, and the like. Alternatively, or in addition, the programmer 110 can use both the user-interfaces 310 and 330 in conjunction.

To further describe implementation of the technical features described herein, consider the following example, where a scope of a programming object 130 is represented as a room in the virtual world 310, and the various programming objects 130 such as the methods, and variables that are in the scope, are depicted as artifacts (vase, mug, table, chair etc.) in the room. Dependencies between the visible objects in the room and other items in the computer program 130 are visible by examining the artifacts in the virtual room, by the avatar of the programmer 110 navigating the virtual world 310. For example, if a programming object 130 instance in the scope is represented by an artifact 350 such as a toy, for example a tin soldier, the publicly accessible members of the programming object 130 can be visible on a banner held by the toy. The banner 355 may be a surface of the rendered virtual object 350, such as the toy, or another surface that is associated with the virtual object 350. The privately accessible members can be visible by lifting the toy and examining the bottom of its base. Thus, the public members are rendered on a visible surface 352 of the toy, while the private members are rendered on a hidden surface 354 of the toy that is not readily visible, rather the avatar of the programmer 110 has to investigate the programming object 130 for the private members. Thus, the visualization engine 124 generates and renders the virtual world 310 for the computer program 130 based on the cognitive programming mask for the programmer 110.

Further, in one or more examples, the virtual world 310 depicts multiple computer programs 130. For example, a first computer program 130 from a first organization/project team is analyzed by the analysis engine and a virtual world 310 representation is created for the computer program 130. Further, the programming development system 120 further generates a second virtual world 310 representation of a second computer program 130 developed by a second organization/project team. For example, the two computer programs may have to be integrated, such as to solve one or more technical problems. Alternatively, or in addition, the first organization may be considering purchase/sale of the second computer program 130, and hence wants to analyze the second computer program 130. Other scenarios are possible in other examples.

The programming development system 120 facilitates analysis, and further visually navigating the computer programs in such cases. For example, the programming development system 120 displays a third virtual world 310 in which the virtual worlds for the first and the second computer programs are combined. Accordingly, the third virtual world 310 depicts two separate virtual worlds corresponding to the two computer programs. A trans-vendor service may be used to provide traversals of the programmers 110 across the worlds, and regions. This facilitates the two companies/project teams that are merging or that have a joint agreement in place between teams, companies, government agencies, etc. to provide read access or write access. The avatar traversal of code may include walking, running, vehicular access, flying, or teleportation. For example, teleporting may be controlled by the programmer 110, team, company, etc. Teleportation may be triggered by using the regions 320 in the virtual world 310, for example by using a landmark (a special tag in the code), by using destination guide (a code guide or code document), by using search button, by selecting a home button or the landmarks on favorites tag, and/or by another avatar offering teleport by sending an invitation.

The technical features described herein facilitate a programming development system to address technical challenges faced by developers/businesses. For example, the programming development system may use a plugin with an artificial intelligence system, such as IBM™ WATSON™ to implement one or more of the features herein. For example, the programming development system suggests a programmer which programming objects, for example functions/variables/object to use when writing code. In one or more examples, the programming development system provides a "type-ahead" functionality, wherein the programming development system provides the suggested programming object name as the programmer 110 initiates typing a name for the programming object. Further, the programming development system can generate and/or suggest documentation for the computer program based on the names of the programming object, and/or other aspects of the programming objects.

Further, the programming development system 120 facilitates companies and/or project teams to have a maintainable and consistent code base by analyzing how code is developed and suggesting changes. Typically, programmers can use linters to provide a consistent code format, but the programming development system improves the maintainability further by ensuring that programmers are naming the variables and functions the correct way, as the code is being written. For example, the programming development system 120 further facilitates the analysis engine to process programming objects, such as functions in an application and verify that the name of the function does what the function accomplishes. For example, if a function is named "toString" and the function does not return a String datatype, the programming development system raises a notification indicating a naming convention flag. For example, the notification may be part of a user-interface notification, an email, an instant-messenger alert, or any other type of an audio-visual alert.

The programming development system can further evaluate a score of a programmer's code maintainability and naming conventions based on who is committing the code to the code base for the computer program. The programming development system further provides a way for companies to scan a code base, for example, before acquisition to ensure that the codebase is maintainable, according to one or more coding standards of the company acquiring the codebase. The acquiring company can thus become aware of development costs before purchasing another company or codebase.

The technical features herein thus help programmers by leveraging cognitive scope and membership analysis of programming objects in a computer program by augmenting the scope and accessible members in a programming user interface by displaying indications of the scope and accessibility. The programming user interface includes a text-editor and a 3D virtual world depicting the computer program. In one or more examples, the technical features facilitate analyzing dependencies between programming objects and functions in the computer program, for example with regard to scope, private public membership conventions, architectural inheritance, among others. The analysis is used for depicting the computer program in the virtual world. Further, the virtual world is generated based on a programmer profile that includes a current user-interface state, history of accessing various objects and lines of code, authorship, expertise information and metrics, and history of programming errors. In one or more examples, the technical features facilitate generating a cognitive programming mask based on the programmer profile. The cognitive programming mask is generated to improve effectiveness at minimizing errors and increasing programmer productivity. For example, the mask assigns a level of importance to a scope relationship of the currently user-interface-accessible variables and methods. The importance level indicates a display-factor that is based on the programmer profile. The cognitive programming mask is thus a set of configuration parameters for generating the virtual world depiction of the computer program, which is an augmented cognitive scope user-interface. The cognitive scope UI is adapted to the cognitive programming mask. The virtual UI augments the text-editor based user-interface with cognitive enhancers to allow the programmer to better grasp the scope and dependencies present in the code being observed/worked on.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for augmenting cognitive scope in a programming development system, the method comprising:
   determining, by a processor, a scope of a programming object in a computer program;
   generating, by the processor, a cognitive programming user-interface mask corresponding to a programmer profile; and
   applying, by the processor, the cognitive programming user-interface mask to a user-interface of the programming development system, the user-interface displaying an indication of the scope of the programming object, wherein:
   the computer program is represented as a virtual world with the programming object represented by a virtual artifact within a virtual bounded region within the virtual world, the virtual bounded region representing the scope of the programming object, and wherein publicly accessible members of the programming object are displayed on a banner associated with the virtual object.

2. The computer implemented method of claim 1, wherein the programming development system includes a virtual world.

3. The computer implemented method of claim 2, wherein the virtual bounded region corresponding to the scope of the programming object is a virtual room, wherein the cognitive programming user-interface mask indicates that the virtual object is to be placed in the virtual room in the virtual world.

4. The computer implemented method of claim 3, wherein privately accessible members of the programming object are displayed on a hidden surface of the virtual object.

5. The computer implemented method of claim 3, wherein the virtual object for the programming object is displayed in the virtual room in response to a display-factor associated with the programming object being above a predetermined threshold.

6. The computer implemented method of claim 1, wherein the indication of the scope of the programming object comprises an icon.

7. The computer implemented method of claim 1, wherein the programmer profile comprises a current user-interface state, a history of accessing the programming object, and history of programming errors.

8. The computer implemented method of claim 7, further comprising, generating, by the processor, a proposed name for the programming object based on a weighting factor assigned to the scope.

9. A programming development system comprising:
a memory;
a virtual reality device configured to display a user-interface comprising a virtual world representation of a computer program; and
a processor coupled with the memory and the virtual reality device, wherein the processor is configured to:
determine a scope of a programming object in the computer program;
generate a cognitive programming user-interface mask corresponding to a programmer profile; and
apply the cognitive programming user-interface mask to the virtual world displayed by the virtual reality device, the user-interface displaying an indication of the scope of the programming object, wherein:
the computer program is represented as a virtual world with the programming object represented by a virtual artifact within a virtual bounded region within the virtual world, the virtual bounded region representing the scope of the programming object, and wherein publicly accessible members of the programming object are displayed on a banner associated with the virtual object.

10. The programming development system of claim 9, wherein the virtual bounded region corresponding to the scope of the programming object is a virtual room, wherein the cognitive programming user-interface mask indicates that the virtual object is to be placed in the virtual room in the virtual world.

11. The programming development system of claim 10, wherein publicly accessible members of the programming object are displayed on a visible surface of the virtual object.

12. The programming development system of claim 10, wherein privately accessible members of the programming object are displayed on a hidden surface of the virtual object.

13. The programming development system of claim 10, wherein the virtual object for the programming object is displayed in the virtual room in response to a display-factor associated with the programming object being above a predetermined threshold.

14. The programming development system of claim 9, further comprising a user-interface device configured to display a text-editor comprising textual representation of the computer program, wherein the user-interface device is further configured to display a graphical indication of the scope of the programming object, the graphical indication being an icon.

15. A computer program product for a programming development system, the computer program product comprising a computer readable storage medium having program instructions embodied therewith, the program instructions executable by a processing circuit to cause the processing circuit to:
display a user-interface comprising a virtual world representation of a computer program;
determine a scope of a programming object in the computer program;
generate a cognitive programming user-interface mask corresponding to a programmer profile; and
apply the cognitive programming user-interface mask to the virtual world for displaying an indication of the scope of the programming object, wherein:
the computer program is represented as the virtual world with the programming object represented by a virtual artifact within a virtual bounded region within the virtual world, the virtual bounded region representing the scope of the programming object, and wherein publicly accessible members of the programming object are displayed on a banner associated with the virtual object.

16. The computer program product of claim 15, wherein the virtual bounded region corresponding to the scope of the programming object is a virtual room, wherein the cognitive programming user-interface mask indicates that the virtual object is to be placed in the virtual room in the virtual world.

17. The computer program product of claim 16, wherein publicly accessible members of the programming object are displayed on a visible surface of the virtual object, and wherein privately accessible members of the programming object are displayed on a hidden surface of the virtual object.

18. The computer program product of claim 16, wherein the virtual object for the programming object is displayed in the virtual room in response to a display-factor associated with the programming object being above a predetermined threshold.

19. The computer program product of claim 15, wherein the program instructions executable by the processing circuit to cause the processing circuit to display a text-editor comprising textual representation of the computer program, and to display a graphical indication of the scope of the programming object, the graphical indication being an icon.

* * * * *